United States Patent
Braxton

(10) Patent No.: US 12,338,017 B2
(45) Date of Patent: *Jun. 24, 2025

(54) METHOD FOR MANUFACTURING BIODEGRADABLE PILLOW TEA BAGS CONTAINING WHOLE LEAF TEA

(71) Applicant: Vanessa Braxton, North Babylon, NY (US)

(72) Inventor: Vanessa Braxton, North Babylon, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,703

(22) Filed: Jan. 23, 2024

(65) Prior Publication Data

US 2024/0158115 A1   May 16, 2024

Related U.S. Application Data

(63) Continuation of application No. 17/151,087, filed on Jan. 15, 2021, now Pat. No. 11,905,053.

(Continued)

(51) Int. Cl.
*B65B 29/02* (2006.01)
*B65B 9/12* (2006.01)
(Continued)

(52) U.S. Cl.
CPC ............ *B65B 29/028* (2017.08); *B65B 9/213* (2013.01); *B65D 85/8085* (2013.01);
(Continued)

(58) Field of Classification Search
CPC ........... B65B 1/12; B65B 9/12; B65B 9/2028; B65B 9/213; B65B 29/028; B65B 37/10;
(Continued)

(56) References Cited

U.S. PATENT DOCUMENTS 2,237,119 A * 4/1941 Smith .................... B65B 9/213
53/546
2,837,883 A   6/1958 Bracey
(Continued)

FOREIGN PATENT DOCUMENTS

DE   102004029430 A1   1/2006
DE   102006034840 A1   1/2008
(Continued)

OTHER PUBLICATIONS

Miflex-Masz "APO-11P Automatic Pyramid Teabag Machine," http://www.miflex-masz.com.pl/uploads/Karty%20produktow/APO-11P.%ang.pdf, retrivied Apr. 6, 2022, with link to youtube video, https://www.youtube.com/watch?v=tKQjh9sfgbl, published Nov. 28, 2016 (Year: 2016).

(Continued)

*Primary Examiner* — Stephen F. Gerrity
(74) *Attorney, Agent, or Firm* — Avyno Law P.C.

(57) ABSTRACT

A biodegradable whole leaf pillow tea bag is provided, along with a system and method for manufacturing biodegradable whole leaf pillow tea bags. The method for manufacturing the whole leaf pillow tea bags includes the steps of providing a biodegradable infusion substrate having two opposing edge; creating a sleeve from the biodegradable infusion substrate by infusing the two opposing edges of the substrate together and closing the sleeve at its bottom; placing whole leaf tea in the bottom of the sleeve; vertically feeding the sleeve containing the whole leaf tea into a heat sealing machine that will, at predetermined intervals create heat seals across the sleeve to create pillow bags; cutting the pillow bags from one another across the heat seal. In one example, the biodegradable infusion substrate may contain hemp and/or the whole leaf tea may be infused with CBD oil or other supplements. The same method of manufacturing (Continued)

may be used to create a biodegradable pillow bag containing coffee.

10 Claims, 8 Drawing Sheets

Related U.S. Application Data

(60) Provisional application No. 62/961,511, filed on Jan. 15, 2020.

(51) Int. Cl.
| | | |
|---|---|---|
| *B65B 9/20* | (2012.01) | |
| *B65B 9/213* | (2012.01) | |
| *B65B 51/30* | (2006.01) | |
| *B65D 85/808* | (2006.01) | |
| *B65D 85/812* | (2006.01) | |

(52) U.S. Cl.
CPC .............. *B65D 85/812* (2013.01); *B65B 9/12* (2013.01); *B65B 9/2028* (2013.01); *B65B 51/303* (2013.01)

(58) Field of Classification Search
CPC .............. B65B 51/303; B65B 2220/14; B65B 2220/16
See application file for complete search history.

(56) References Cited

U.S. PATENT DOCUMENTS

| | | | |
|---|---|---|---|
| 2,978,853 A * | 4/1961 | Price | ...................... B65B 9/213 53/546 |
| 2,994,996 A | 8/1961 | Klar | |
| 3,082,586 A | 3/1963 | Schneider et al. | |
| 3,172,245 A | 3/1965 | Aquarius et al. | |
| 4,277,302 A | 7/1981 | Reid | |
| 4,417,433 A | 11/1983 | Mitchell | |
| 4,813,205 A | 3/1989 | Mikata et al. | |
| 8,776,481 B2 | 7/2014 | Miyahara et al. | |
| 8,828,895 B2 | 9/2014 | Foss et al. | |
| 9,988,205 B2 | 6/2018 | Foss et al. | |
| 10,071,852 B2 | 9/2018 | Stewart et al. | |
| 11,905,053 B2 * | 2/2024 | Braxton | .................. B65B 9/213 |
| 2014/0260121 A1 | 9/2014 | Tokuda et al. | |
| 2018/0116240 A1 | 5/2018 | Docherty et al. | |
| 2019/0062042 A1 | 2/2019 | Wilbur | |
| 2019/0106226 A1 | 4/2019 | Persson et al. | |
| 2020/0305458 A1 | 10/2020 | Dugar et al. | |

FOREIGN PATENT DOCUMENTS

| | | | |
|---|---|---|---|
| DE | 202018104408 U1 | 8/2018 | |
| FR | 3060949 A1 | 6/2018 | |
| JP | 2011079536 A | 4/2011 | |
| WO | WO-9947423 A2 * | 9/1999 | ........... B65B 29/028 |
| WO | 2010146716 A1 | 12/2010 | |
| WO | 2013179460 A1 | 12/2013 | |
| WO | 2017221263 A1 | 12/2017 | |

OTHER PUBLICATIONS

Miflex-Masz "Machines APO-11 Semi-automatic packing machine," http://www.miflex-masz.compl/maszyny-i-urzadzenia/herbata-i-ziola/apo-11, retrieved Apr. 6, 2022, with link to youtube video, https://www.youtube.com/watch?v=XdCSNp38tEl, published Feb. 12, 2015 (Year: 2015).
Vahdam, "How Is Whole Leaf Tea . . . " retrieve from https://www.vandamteas.com/blogs/news/how-is-whole-leaf-differnet-and-how-do-you-tell-it-apart#:~:text=Whole%20leaf%20tea%20usually%20means%20that%20the%20tea,differnece%20between%20whole%20leaf%20teas%20from%20other%20teas%3F, published Jun. 14, 2017 (Year: 2017).

* cited by examiner

```
┌─────────────────────────────────────────┐
│ PROVIDE A CONTINUOUS SHEET OF           │─── 802
│ BIODEGRADABLE INFUSION MATERIAL         │
└─────────────────────────────────────────┘
                    ↓
┌─────────────────────────────────────────┐
│ FEED THE SHEET OF BIODEGRADABLE INFUSION│
│ MATERIAL DOWNWARD INTO A SEALING AND    │─── 804
│ CUTTING SYSTEM HAVING A TEA DISPENSING  │
│ MECHANISM                               │
└─────────────────────────────────────────┘
                    ↓
┌─────────────────────────────────────────┐
│ FORM THE BIODEGRADABLE INFUSION MATERIAL│
│ INTO A TUBULAR MEMBER BY WRAPPING THE   │─── 806
│ BIODEGRADABLE INFUSION MATERIAL AROUND  │
│ A VERTICAL TUBE ON THE SEALING AND      │
│ CUTTING SYSTEM                          │
└─────────────────────────────────────────┘
                    ↓
┌─────────────────────────────────────────┐
│ SEAL THE FREE ENDS OF THE BIODEGRADABLE │
│ INFUSION MATERIAL WRAPPED AROUND THE    │─── 808
│ TUBE WITH A VERTICAL SEALING MECHANISM  │
└─────────────────────────────────────────┘
                    ↓
┌─────────────────────────────────────────┐
│ ADVANCE THE VERTICALLY SEALED TUBULAR   │
│ BIODEGRADABLE INFUSION MATERIAL PAST    │
│ THE LOWER END OF THE TUBE ON THE SEALING│─── 810
│ AND CUTTING SYSTEM UNTIL IT REACHES A   │
│ HORIZONTAL SEALING MEMBER               │
└─────────────────────────────────────────┘
                    ↓
┌─────────────────────────────────────────┐
│ CREATE A HORIZONTAL SEAL ALONG THE      │
│ BOTTOM OF THE TUBULAR BIODEGRADABLE     │─── 812
│ INFUSION MATERIAL WITH A HORIZONTAL     │
│ SEALING MECHANISM                       │
└─────────────────────────────────────────┘
                    ↓
┌─────────────────────────────────────────┐
│ DEPOSIT A PREDETERMINED AMOUNT OF WHOLE │
│ LEAF TEA IN THE BOTTOM OF THE TUBULAR   │
│ BIODEGRADABLE INFUSION MATERIAL BY      │─── 814
│ DISPENSING A PREDETERMINED AMOUNT OF    │
│ WHOLE LEAF TEA THROUGH THE TUBE ON      │
│ SEALING AND CUTTING SYSTEM              │
└─────────────────────────────────────────┘
                    ↓
┌─────────────────────────────────────────┐
│ ADVANCE THE TUBULAR BIODEGRADABLE       │
│ INFUSION MATERIAL BELOW THE HORIZONTAL  │
│ SEALING MECHANISM SUCH THAT THE TEA     │─── 816
│ DEPOSITED IN THE BOTTOM OF THE TUBULAR  │
│ BIODEGRADABLE INFUSION MATERIAL IS      │
│ BELOW THE HORIZONTAL SEALING MECHANISM  │
└─────────────────────────────────────────┘
                    ↓
┌─────────────────────────────────────────┐
│ SEAL THE TUBULAR BIODEGRADABLE INFUSION │
│ MATERIAL TO CREATE A TOP SEAL ON THE    │
│ TUBULAR BIODEGRADABLE INFUSION MATERIAL │─── 818
│ BELOW THE HORIZONTAL SEALING MECHANISM  │
│ AND CUTTING THE SEAL AT ITS MIDDLE TO   │
│ RELEASE A BIODEGRADABLE PILLOW TEA BAG  │
└─────────────────────────────────────────┘
```

METHOD FOR MANUFACTURING BIODEGRADABLE PILLOW TEA BAGS CONTAINING WHOLE LEAF TEA

CROSS-REFERENCE TO RELATED APPLICATIONS

This application is a continuation of U.S. Ser. No. 17/151,087, titled METHOD FOR MANUFACTURING BIODEGRADABLE PILLOW TEA BAGS CONTAINING WHOLE LEAF TEA, filed Jan. 15, 2021, which application claims priority to U.S. Provisional Application No. 62/961,511, titled BIODEGRADABLE PILLOW TEA BAGS CONTAINING WHOLE LEAF TEA AND A SYSTEM AND METHOD FOR MANUFACTURING THE SAME, filed on Jan. 15, 2020, both applications of which are incorporated by reference into this application in their entirety.

FIELD OF INVENTION

The invention relates to biodegradable pillow tea bags containing whole leaf tea, and systems and methods for manufacturing the biodegradable pillow tea bags, as well as the use of CBD infused whole leaf tea in the manufactured pillow tea bags, which leaf tea may optionally also include THC or other supplements.

BACKGROUND

Tea bags have been used for centuries in the tea industry. Tea bags were first made of paper that was folded and stitched by hand into square bags. Tea bags are typically small, porous pouches that contain dried leaves, flowers, or herbs. Tea bags essentially work as a simplified tea infuser and are infused in hot or boiling water to brew tea.

In the early 1900's, a 'tea leaf holder' was first patented by stitching mesh fabric to enable leaf tea to expand and infuse flavor while also making tea brewing more convenient. Silk and gauze were later used for the infusion substrate. Later tea bags began being made on machinery with heat-sealed paper and were mass produced. Now, tea bags are generally made of chlorine bleached filter paper and/or food-grade plastics. Tea bags often include a string that enables easy removal and a small tag with brewing instructions.

Unlike whole leaf teas, tea bags generally contain broken leaves, dust, and fannings created during the CTC or cut-tear-curl method of production. The leaves are placed into large rolling machines that break down whole leaves into smaller pieces that fit into tea bags. This means that tea bags typically do not contain the whole tea leaf. Thus, they don't contain all the healthy compounds such as 1-theanine and antioxidants that help to detox and improve overall health.

Additionally, many tea bags are too small and constrict the leaf tea from expanding in the water and releasing flavor. When the leaves are restricted, they don't fully infuse flavor. Thus, many believe that tea bags produce tea that often doesn't taste good.

Further concerns with traditional tea bag relate to the plastic composition in the bags. It is believed that the plastic in tea bags can be toxic to ingest and overtime, can cause stomach problems and increased risks of cancer. In particular, conventional tea bags can contain polypropylene, which is believed to adversely affect the body's endocrine system. Further, due to the plastic content in conventional tea bags, the conventional tea bags cannot completely decompose. This makes them a bad option for compost material and the environment.

Teas may be made from the leaves of the Camellia sinensis plant and include white tea, green tea, oolong tea, pu-erh tea, and black tea. Herbal teas are made from all other plants and include popular favorites such as ginger tea, apple tea, and chamomile tea. For the reasons set forth above, it is a preference of many to use whole leaf tea for flavor and to use other tools, besides tea bags, for brewing tea, despite the convenience of tea bags. While materials for biodegradable tea bags are known and are becoming more available, a need still exists for biodegradable tea bags manufactured to contain whole leaf tea. A need further exists for making tea infused with CBD oil, and or a combination of CBD and THC, and for manufacturing whole leaf teas in biodegradable tea bags having the health benefits of CBD oil and/or other supplements.

SUMMARY OF THE INVENTION

The present invention relates to biodegradable pillow tea bags manufactured to contain whole leaf tea. Web materials and/or fibers that are biodegradable and that may be used to make tea bags are known. One example of such material can be found in U.S. Pat. No. 8,828,895, which patent is incorporated in its entirety by reference into his application, and which teaches the use of a plurality of mono-component, mono-constituent Polylactic Acid (PLA) fibers free from plasticizers and other surface treatments to make infusion pouches. While biodegradable infusion material is known, the present invention may include the use of the flowers, isolates, hemp and hemp CBD oils, including but not limited to water soluble CBD oils and powders. In other examples, flowers, isolates and hemp CBD oils, including but not limited to water soluble CBD oils and powders may also be incorporated and infused with the leaf tea.

It has not been known to use biodegradable infusion material to manufacture biodegradable pillow tea bags that contain whole leaf tea. Here, a method and system of manufacturing biodegradable pillow tea bags is provided that comprises the vertical feeding of biodegradable infusion material (or infusion substrate material) into a sealing and cutting machine, where the biodegradable infusion material is a continuous sheet of material having two opposing ends. The material is vertically wrapped around a tube and the opposing ends of the material are then joined and sealed together to form a sleeve from the material. The sleeve, still wrapped around the tube, is then advanced downward toward the bottom of the system for manufacturing the pillow tea bags, where the bottom of the sleeve is horizontally sealed and closed at its end. Whole leaf tea are then fed into the sealed end of the sleeve, in predetermined amounts. The sleeve is then advanced further downward and another horizontal seal is created a few inches from the first seal, thereby creating a sealed compartment on three sides with whole leaf tea positioned in the middle.

The second seal is then cut through its middle, causing the creation of a completely sealed pillow tea bag. By cutting the seal through its middle, the sleeve then continues to be sealed at its far end for repeating the process and creating numerous biodegradable whole leaf pillow tea bags.

The system for manufacturing the biodegradable Whole leaf tea bags includes both vertical and horizontal sealing components with a cutter associated with the horizontal sealing component for cutting away the sealed compartments into individual pillow tea bags as they are formed. A tube for feeding predetermined amounts of whole leaf tea is also provide for filling the bottom of the sleeve with leaf tea as the pillow bags are formed. The tea may be dispensed into the feeding tube using various types of known dispensers. The machine may be controlled by a computer that includes a display screen. The operation of the machine may be controlled through the display, remotely through a computer software application or mobile application interface, or both.

Through the above processes and methods, a biodegradable pillow tea lag is formed containing whole leaf tea. In one implementation, the whole leaf tea may be infused with CBD oil, and/or a combination of CBD and THC, to provide the health benefits of CBD oil with the tea. In another implementation, the biodegradable pillow tea bags may be made, at least partially or entirely, from hemp.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

DESCRIPTION OF FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 8 is a flow diagram of the method of creating a biodegradable pillow tea bag of the present invention.

DETAILED DESCRIPTION OF FIGURES

The present invention relates to biodegradable pillow tea bags 100 containing whole leaf tea 102 and methods and processes for manufacturing biodegradable pillow tea bags 100 containing whole leaf tea 102, which may include fully or partial dried tea leaves for making a tea drink, such that a substantial portion of the leaf tea remains whole in the pillow tea bags 102 and are not broken or turned to dust during the manufacturing process.

Figure 2:
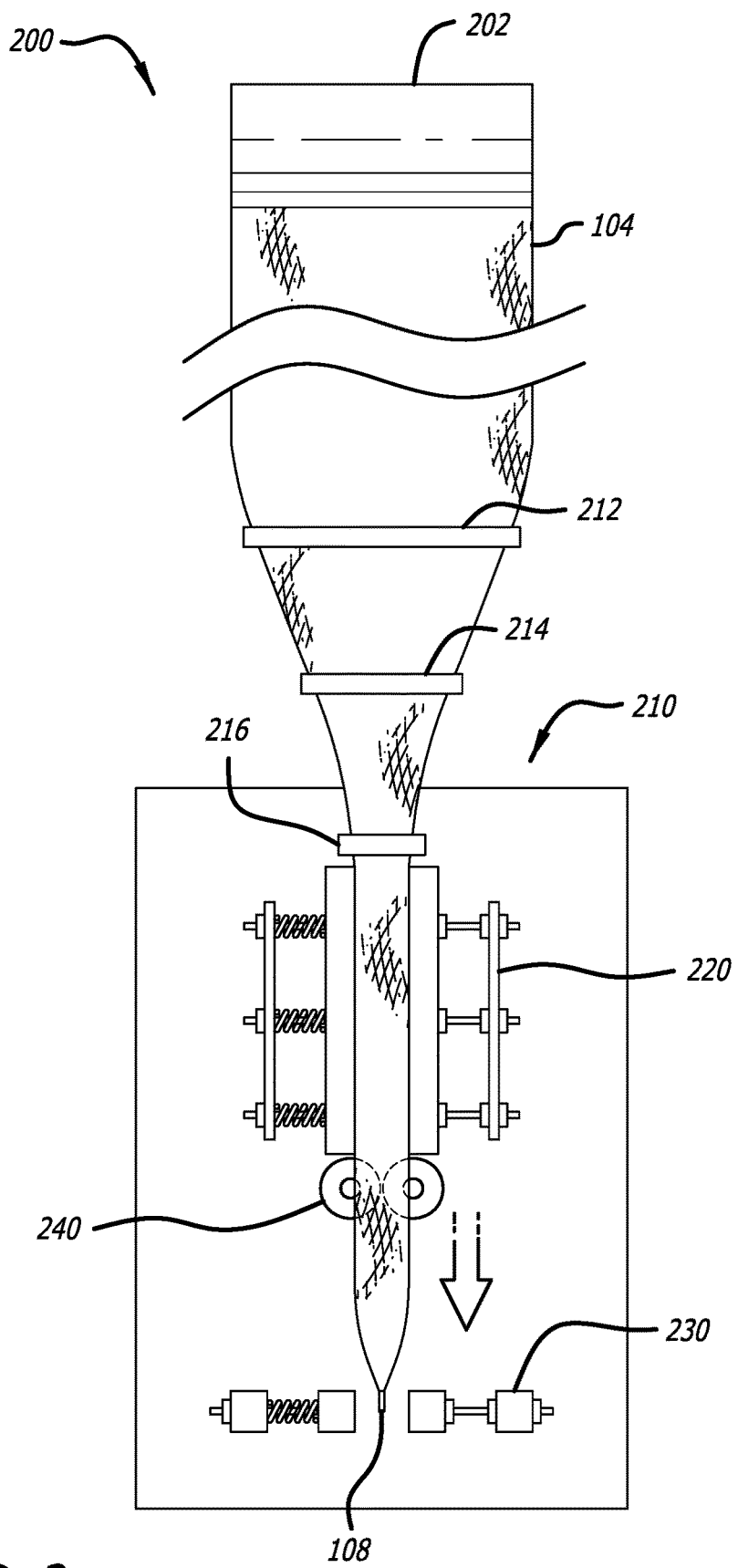
FIG. 2 is one example of a system for manufacturing biodegradable pillow tea bags of the present invention.

As will be better illustrated in connection with the figures below, the method of manufacturing involves a system 200 for the vertical manufacturing of the biodegradable pillow tea bags 102 where a continuous sheet of biodegradable infusion material 104 is wrapped around a feeding tube 340 and fed into a sealing machine 200 (FIG. 2). As explained further below in connection with FIGS. 2-7, the sealing machine 210 includes sealing components 220, 230 (which also may be referred to as sealing mechanisms) for joining and sealing the edges of the biodegradable infusion material 104 together to create a sleeve or tubular member. A horizontal sealing component including cutting capabilities 230 is positioned at a predetermine distance below the vertical sealing component 220 to seal the top and bottom of the biodegradable pillow tea bags 100 across the sleeve of the biodegradable infusion material 104 to create the top and bottom seals 106, 108 and to cut away the sealed compartments into individual pillow tea bags 100 as they are formed. A dispenser 300 provides predetermined amounts of whole leaf tea to the feeding tube 340 for filling the bottom of the sleeve of biodegradable infusion material 104 with whole leaf tea as the biodegradable pillow tea bags 100 are formed. The sealing and dispensing machine 210 may be controlled by a computer that includes a display screen. The operation of the machine may be controlled through a display, remotely through software application (via a computer or mobile device), or both.

Figure 1A:
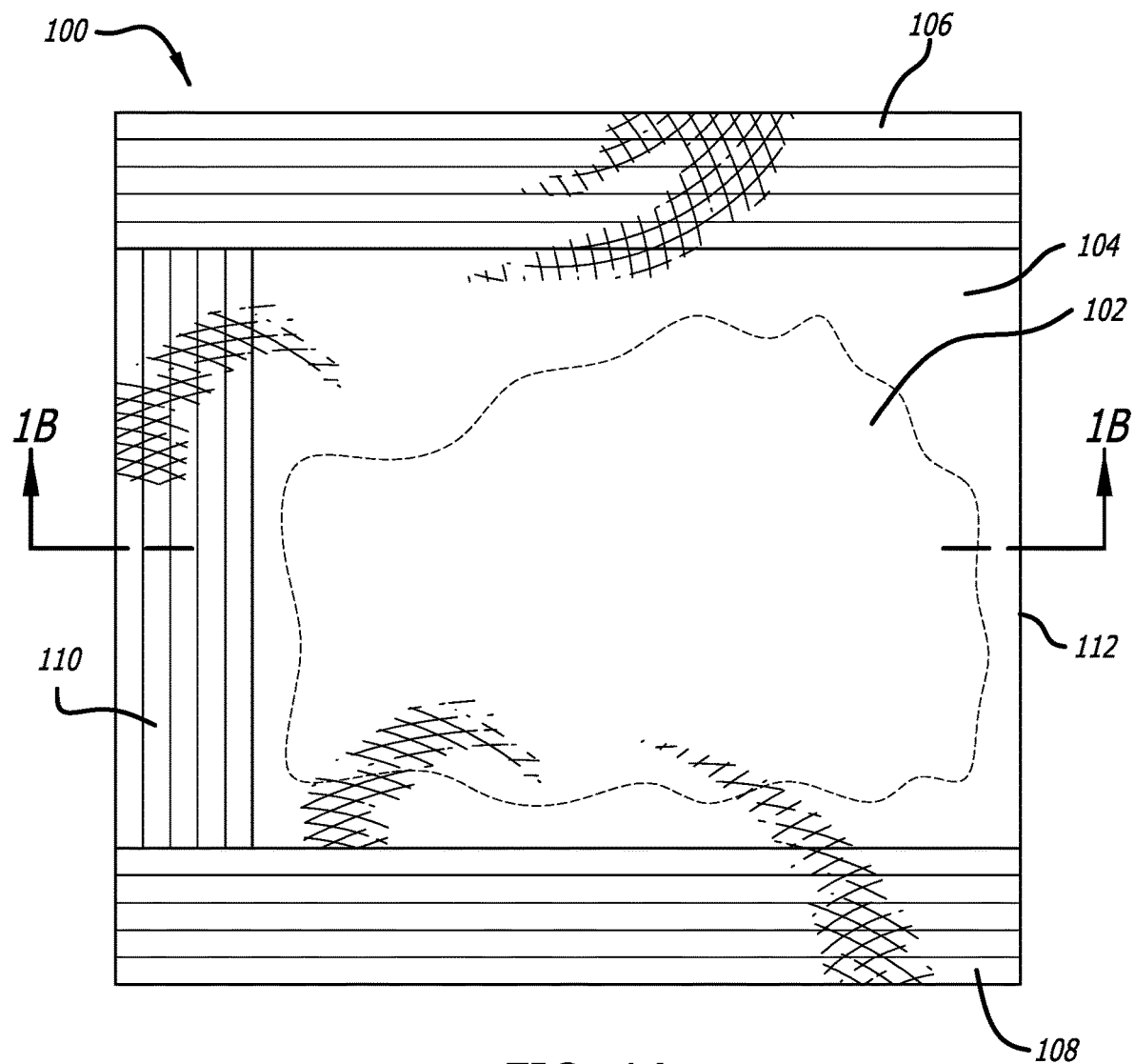
FIG. 1a is one example of a biodegradable pillow tea bag containing whole leaf tea.
Figure 1B:
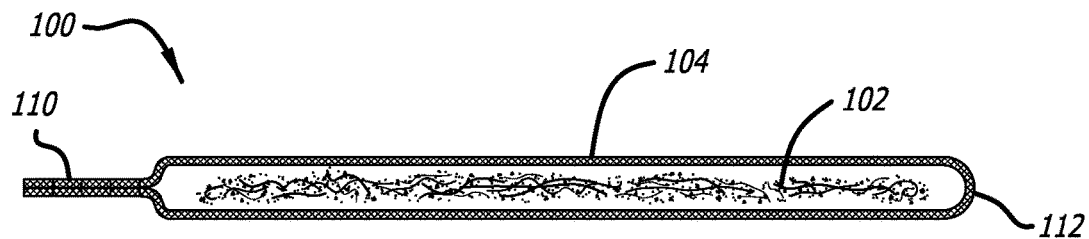
FIG. 1b is a cross-section of the biodegradable pillow tea bag of FIG. 1 taken along line 1B-1B.

Turning now to FIGS. 1a and 1b, FIG. 2a is one example of a biodegradable pillow tea bag 100 containing whole leaf tea 102, and FIG. 1B is a cross-section of the biodegradable pillow tea bag 100 of FIG. 1 taken along line 1B-1B. The biodegradable pillow tea bag 100 of the present invention includes biodegradable infusion material 104 folded in half such that a fold 112 is created on one side of the biodegradable tea bag 100. The bag 100 is sealed on its top 106, bottom 108 and side 110 opposing the fold 112 with whole leaf tea 102 encased inside the biodegradable infusion material 104 to form a biodegradable pillow tea bag 100. The seals 106, 108 and 110 may be scored to assist with the steeping of the whole leaf tea 102. The biodegradable pillow tea bag 100 may also be further scored at need to assist with the steeping of the tea 102.

FIG. 1b shows the biodegradable pillow tea bag 100 formed by folding over and joining two opposing ends of a sheet of biodegradable infusion material 104 on the side opposite the fold 112 and sealing the ends of the infusion material on the side to create a side seal 110 and then sealing the infusion material 104 at it top and bottom 106 and 108 creating a biodegradable pillow tea bag from the infusion material 104 by sealing the folded material on three sides 106, 108, 110. Whole leaf tea is placed within the folded sheet of infusion material 104 prior to completely sealing all open edges of the infusion material 104 to create a pillow tea bag. As will be explained in more detail below, the whole leaf tea 102 may be infused with CBD oil prior to being placed in the pillow tea bag 102. Optionally, the leaf tea 102 can be infused with both CBD and TCH or other supplements and/or materials having known health benefits, including vitamins, nutrients, and supplements (all of the above deemed "supplements" for purposes of this application).

While any material can be used in connection with the present invention, biodegradable material 104 is preferred for the reasons set forth above. Such biodegradable material should be made from biodegradable substrates capable of infusing tea into a liquid. Various types of biodegradable web materials and/or fibers are known for use in making tea bags. One example of such material can be found in U.S. Pat. No. 8,828,895, which patent is incorporated in its entirety by reference into his application, and which teaches the use of a plurality of mono-component, mono-constituent Polylactic Acid (PLA) fibers free from plasticizers and other surface treatments to make infusion pouches. The infusion material 140 may be referred to in this application also as an infusion substrate. While certain biodegradable infusion material 104 is known, the present invention may also include the use of the flowers, isolates, hemp, and hemp CBD oils, including but not limited to water soluble CBD oils and powders, with the known biodegradable infusion materials to create the tea bags 102. In other examples, flowers, isolates, supplements, and hemp CBD oils, including but not limited to water soluble CBD oils and powders may also be incorporated with the leaf tea 102, which may optionally include TCH.

Figure 3:
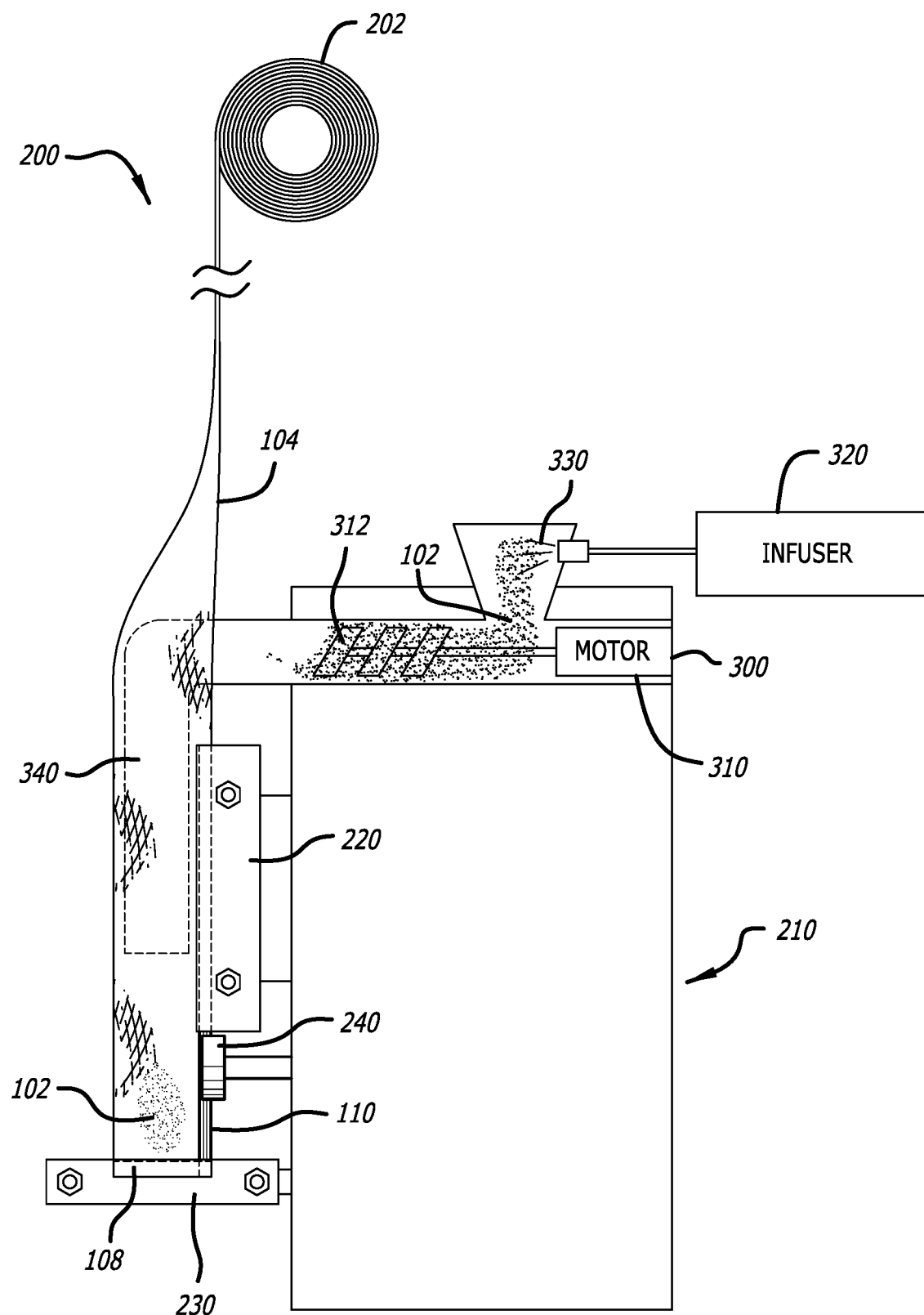
FIG. 3 is a side view of the system of FIG. 2 showing the vertical and horizontal sealing mechanisms/components, advancing rollers, tea dispensing system and optional infuser.

FIG. 2 is one example of a system 200 for manufacturing biodegradable pillow tea bags 100 of the present invention. As illustrated in FIG. 2, the system 200 of the present invention includes a sealing and cutting machine 210 having a vertical sealing mechanism 220 and horizontal sealing and cutting mechanism 230. In operation, a sheet of biodegradable infusion material 104 is fed from a roll 202 of the biodegradable infusion material 104 into a heat sealing and cutting apparatus 210. The sheet of biodegradable infusion material 104 is formed into a tubular shape by concentric spaced apart rings 212, 214, 216 that wraps the biodegradable infusion material 104 around a feeding tube 340 (FIG. 3). The vertical sealing mechanism 220 closes the tubular biodegradable infusion material 104 along its side edges around the feeding tube 340 by heat sealing and/or scoring the edges of the wrapped biodegradable infusion material 104 together to create a sleeve. The sealing and cutting machine 230 further includes rollers 240 for engaging the sealed vertical side edge of the biodegradable infusion material 104 and advancing it downward toward a horizontal sealing mechanism 230, which creates a seal 108 at the bottom of the sleeve of tubular biodegradable infusion material 104. In FIG. 2, both the vertical and horizontal sealing mechanisms 220 and 230 are illustrated in their open state.

FIG. 3 is a side view of the system 200 of FIG. 2 showing the vertical and horizontal sealing components 220, 230 and advancing rollers 240. FIG. 3 best illustrates the roll 202 of biodegradable infusion sheet material 104 being wrapped around feeding tube 340 and being joined and sealed at opposing side edges of the biodegradable sheet material 104 by the vertical sealing mechanism 220 to create seal 110, which may be a heat seal and/or a seal created by scoring, or other known method for sealing sheet material 104.

In the illustrated example, the feeding tube 340 is connected to a dispenser 310, having a motor 300 and optionally an auger 312 for dispensing a predetermined amount of whole leaf tea 102 into the feeding tube 340. The feeding tube 340 may be connected directly to the dispenser 300 or may be open at its top for receiving the whole leaf tea 102 from the dispenser 300. Also as shown, the present invention may optionally include an infuser 320 for infusing tea placed in the dispenser 300 with a supplement 330, as described above, prior to dispensing the tea into the feeding tube 340. Optionally, whole leaf tea 102 that has previously been infused with supplements may be feed into the dispenser 300 without the need for an infuser 320.

As shown in FIG. 3, predetermined amounts of whole leaf tea 102, once dispensed into the feeding tube 340 drop to the bottom of the sleeve of biodegradable infusion sheet material 104. The predetermined amount of whole leaf tea 102 dispensed is enough to create a single tea bag 100. As will be further explained below, once the predetermined amount of whole leaf tea 102 is at the bottom of the sleeve of biodegradable infusion sheet material 104, the system 200, using rollers 240, advances the sleeve of biodegradable infusion sheet material 104 below the horizontal sealing mechanism 500 to create a seal across the sleeve of biodegradable infusion sheet material 104 which is then cut through its middle to create the top seal 106 of a completed biodegradable pillow tea bag 100 and the bottom seal 108 for the next subsequently created biodegradable pillow tea bag 100.

Figure 4:
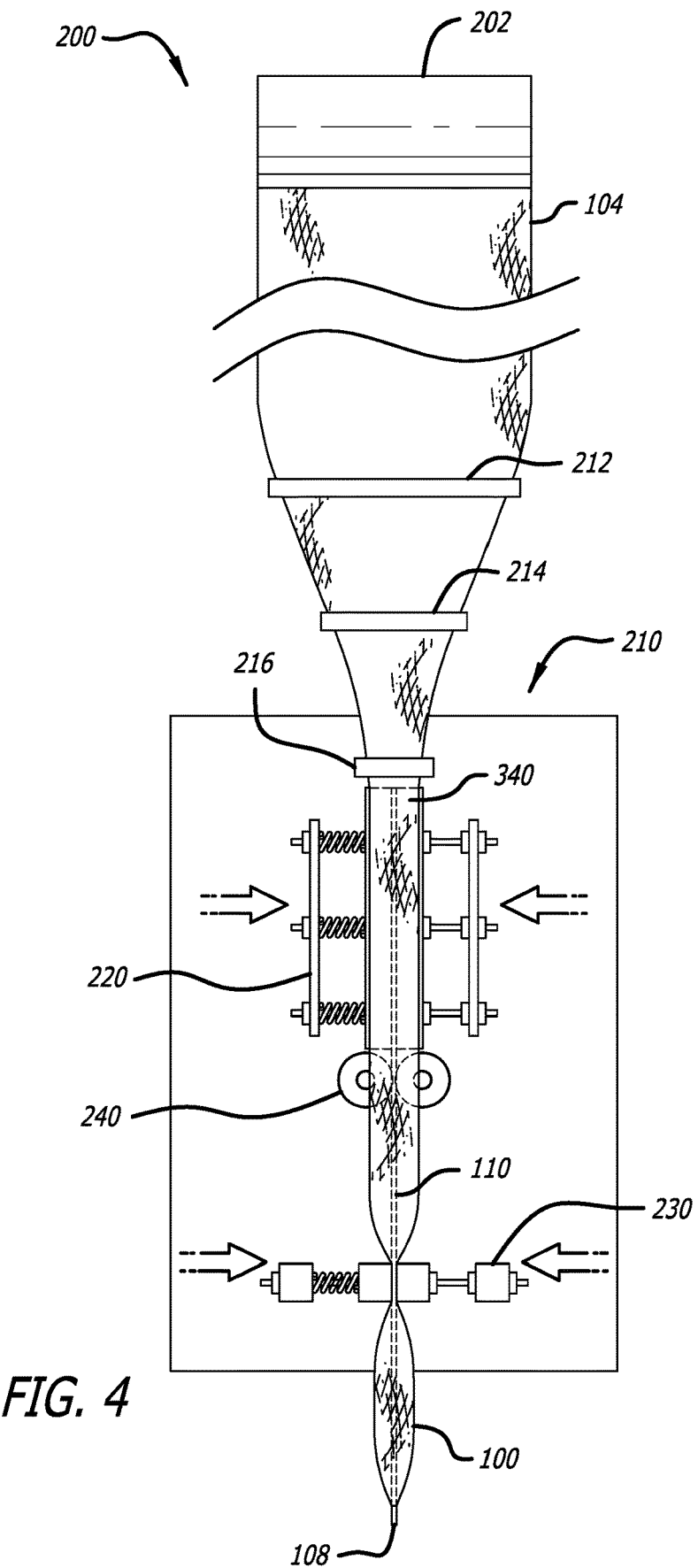
FIG. 4 is a front view of the system of FIG. 2 showing the vertical feeding of a sleeve of biodegradable infusion material into the system, the movement of the vertical and horizontal sealing mechanisms/components to create a biodegradable pillow tea bag sealed on three sides, with the horizontal sealing mechanism in a closed position, creating a heat seal for a biodegradable pillow tea bag.

FIG. 4 is a front view of the system 200 of FIG. 2 showing the vertical movement of a sleeve of biodegradable infusion material 104 through the system 200. Here, the sleeve or tubular biodegradable infusion material 104 has been advanced by the rollers 240 engaging the seal 110 on the sleeve of biodegradable infusion material 104 such that the bottom seal 108 of the sleeve of biodegradable infusion material 104 containing a predetermined amount of the dispensed whole leaf tea 102 is positioned below the horizontal sealing mechanism 230. Here, the vertical and horizontal sealing mechanisms 220, 230 are showing in the closed positioned. The vertical and horizontal sealing mechanisms 220, 230 move from their open positions to their closed positions in the direction of the arrows shown on FIG. 4 to create the seals on the biodegradable pillow tea bags 100 such that the biodegradable pillow tea bags 100 are sealed on three sides, where the seal 110 opposite the fold 112 on the biodegradable pillow tea bag 100 is created by the vertical sealing mechanism 220 and the top and bottom seals 106 and 108 are created by the horizontal sealing mechanism 230.

Figure 5:
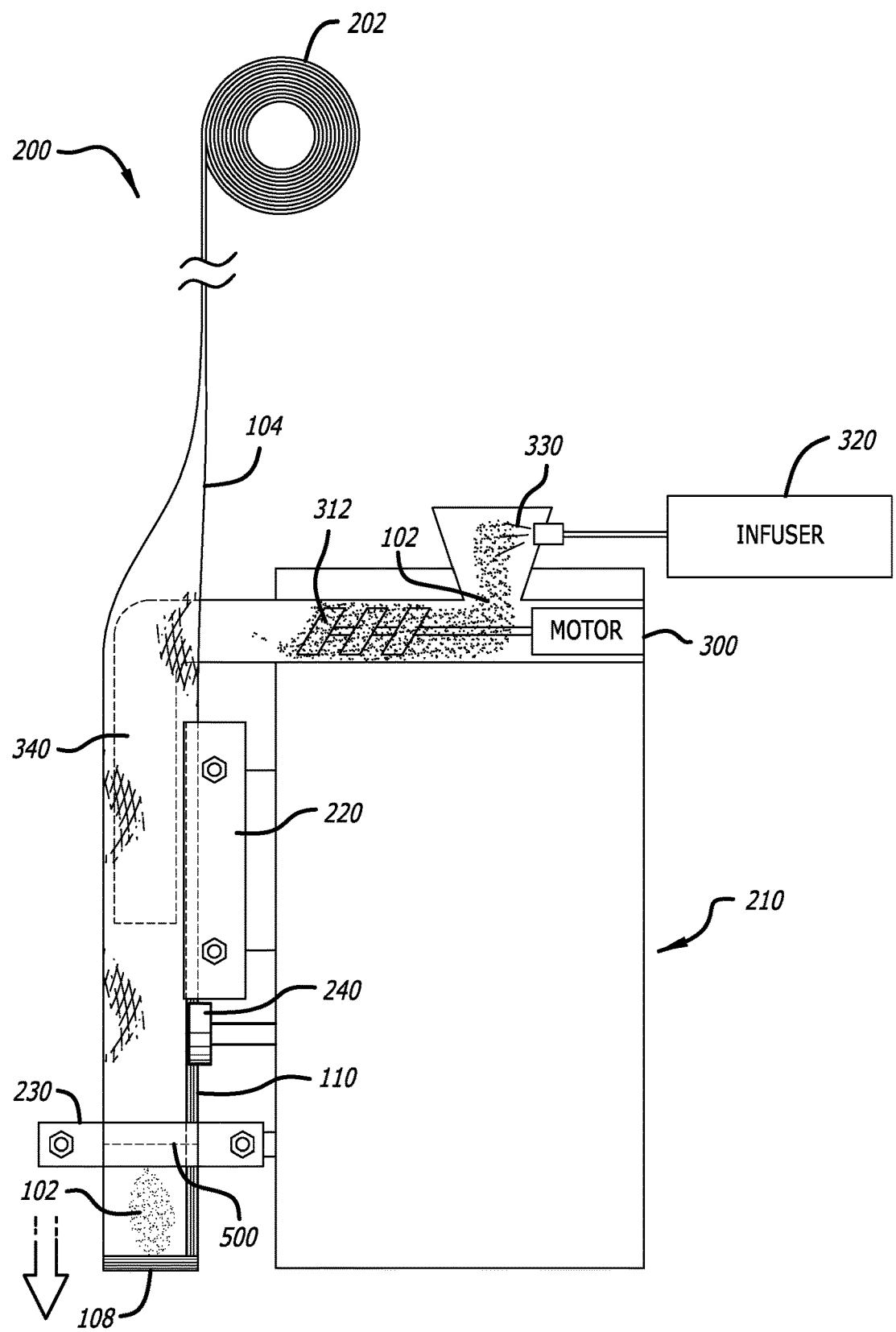
FIG. 5 is a side view of the system of FIG. 4 showing the vertical and horizontal sealing mechanisms, advancing rollers, tea dispensing system and optional infuser with a filled tea bag advanced below the horizontal sealing mechanism.

FIG. 5 is a side view of the system 200 of FIG. 4 showing the vertical and horizontal sealing components 220, 230, rollers 240, dispensing system 300 and optional infuser 320. In this example, the bottom seal 108 of the sleeve of biodegradable infusion material 104 filled with a predetermine amount of whole leaf tea 102 dispensed by dispenser 300 is positioned below the horizontal sealing component 230 to create the biodegradable pillow tea bag 100. Here, as shown in FIG. 4, the horizonal sealing component 230 is closed, creating, in this example, a heat seal across the sleeve of biodegradable infusion material 104, which is cut by the horizontal sealing component 230 at 500, which is the centerline of the seal. The horizontal sealing component 230 may cut the seal by applying higher heat across the center of the seal 500 to sever the seal or by using a cutting mechanism (e.g., blade) as further illustrated in connection with FIG. 7 below.

Figure 6:
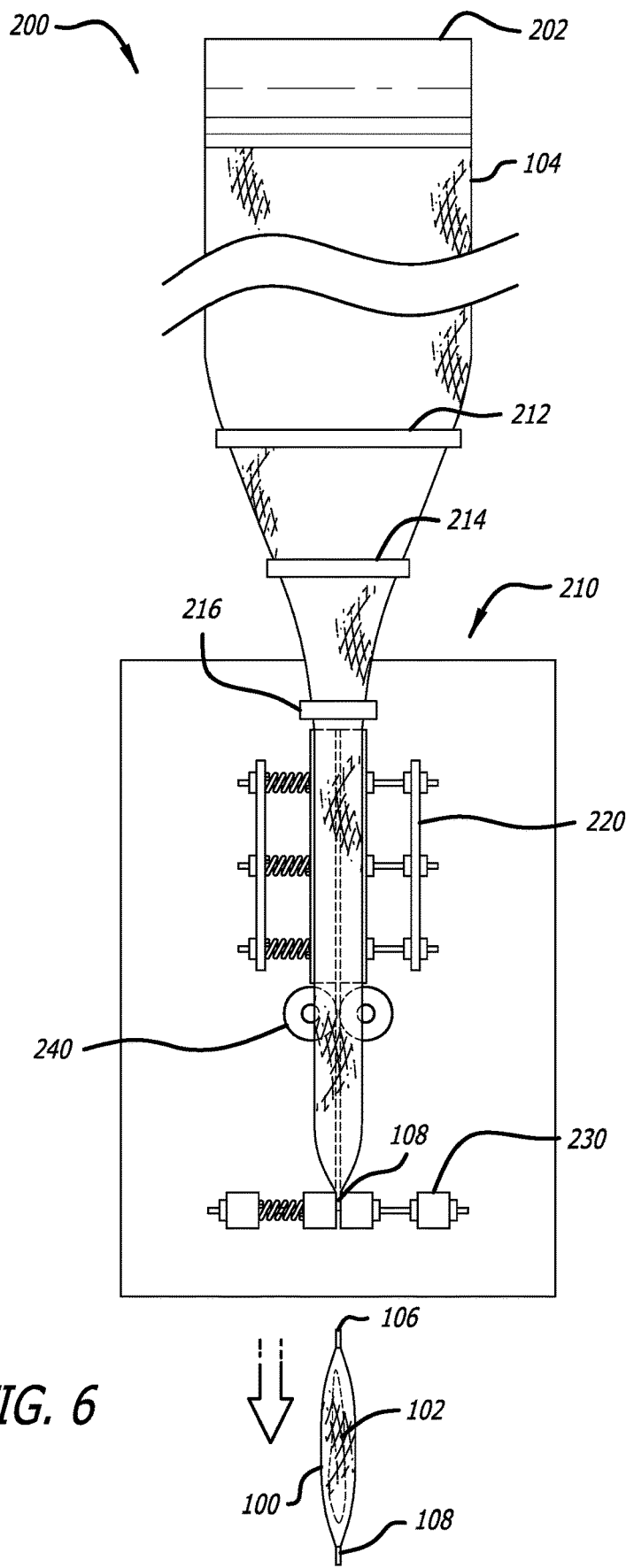
FIG. 6 is a front view of the system of FIG. 4 showing the horizontal sealing mechanism creating a biodegradable pillow tea bag sealed on three sides with the horizontal sealing mechanism in a closed position, showing the sealing component cutting a sealed pillow tea bag from the horizontal sealing component.

FIG. 6 is a front view of the system 200 of FIG. 4 showing the horizontal sealing mechanism 230 cutting the seal and creating a biodegradable pillow tea bag 100 sealed on three sides 106, 108 and 110. As shown, once the cut 500 (FIG. 5) is made across the seal, the seal is divided to create the top seal 106 of the biodegradable pillow tea bag 100 and the bottom seal 108 of the next biodegradable pillow tea bag 100 to be completed. Once sealed and cut at its top 106, the completed biodegradable pillow tea bag 100 drops from the machine for collection and packaging as the horizontal sealing mechanism 230 begins to return to its open position to allow for the completion of the next successive tea bag 100. In this manner, the sleeve of the biodegradable infusion material 104 is be filled with loose whole leaf tea 102 and advanced downward below the horizontal sealing mechanism 230 to be sealed and cut away to create the next successive biodegradable pillow tea bag 100.

Figure 7:
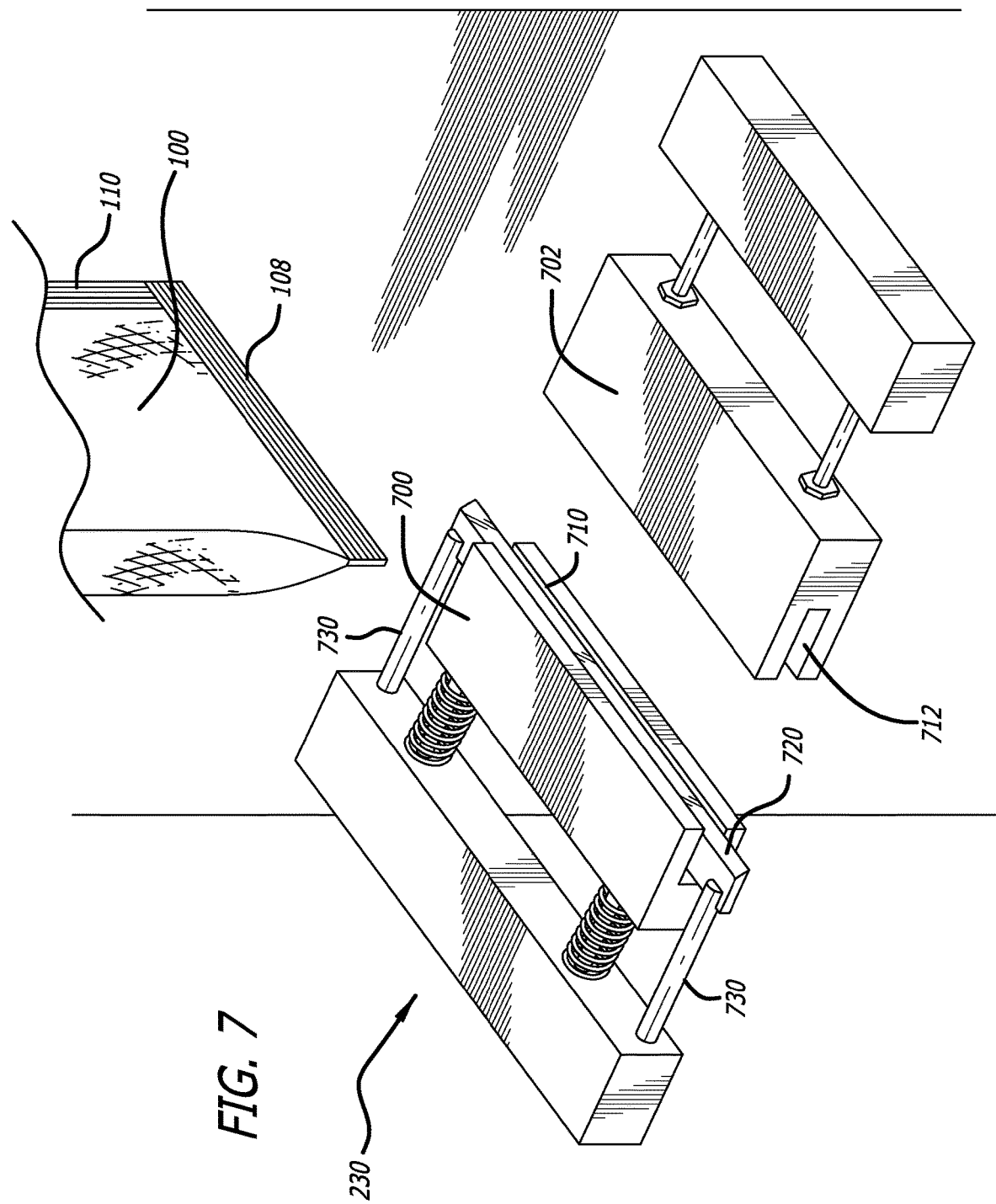
FIG. 7 is a front perspective view of one example of a horizontal sealing component that may be used with the system of the present invention, showing a central channel in at least one clamping component for housing a blade.

FIG. 7 is a front perspective view of one example of a horizontal sealing mechanism 230 that may be used in connection with the system 200. As shown in FIG. 7, the horizontal sealing mechanism 230 includes a right and left clamping components 700 and 702. In this example, the blocks 700 and 702 include heating elements used to create a heat seal on the sleeve of biodegradable infusion material 104, such that the surface of blocks contacting the biodegradable material 104 are heated. One or more of the clamping components 700 and 720 may also include central channels 710, 712 such that at least one of the clamping components 700 and 720 can house a blade 720 that can be actuated by actuating mechanisms 730 to cut through the center of the seal on the sleeve of the biodegradable infusion material 104 created by the horizontal sealing mechanism 230.

FIG. 8 is a flow diagram of a method 800 of creating a biodegradable pillow tea bag 100 of the present invention. The method 800, at step 802, provides a continuous sheet of biodegradable infusion material 104 and at step 804, feeds the sheet of biodegradable infusion material 104 downward into a sealing and cutting system having a tea dispensing mechanism attached thereto. At step 806, the method includes the step of forming the biodegradable infusion material 104 into a tubular member by wrapping the biodegradable infusion material 104 around a vertical tube on the sealing and cutting system. At step 808, the free ends of the biodegradable infusion material 104 wrapped around the tube are sealed with a vertical sealing mechanism. At step 810, the vertically sealed tubular biodegradable infusion material 104 is advanced past the lower end of the tube on the sealing and cutting system 210 until it reaches a horizontal sealing mechanism 230. At step 812, a horizontal seal is created along the bottom of the sleeve of the biodegradable infusion material 104 with the horizontal sealing mechanism 230. At step 814, a predetermined amount of whole leaf tea 102 is deposited in the bottom of the tubular biodegradable infusion material 104 by dispensing a predetermined amount of whole leaf tea 102 through the tube on sealing and cutting system 210. At step 816, the tubular biodegradable infusion material is advanced below the horizontal sealing mechanism 230 such that the tea 102 deposited in the bottom of the tubular biodegradable infusion material 104 is below the horizontal sealing mechanism 230. At step 818, the tubular biodegradable infusion material 104 is sealed to create a top seal on the tubular biodegradable infusion material 104 and the horizontal sealing mechanism cuts the seal at its middle to release a biodegradable pillow tea bag 100. The process is then repeated starting step 814 to create addition biodegradable pillow tea bag 100, until the desired about to biodegradable pillow tea bags 100 have been produced.

Optionally, the method of FIG. 8 may include the step of infusing the tea 102 with a supplement 330 prior to dispensing the tea in the biodegradable pillow tea bag 100. As discussed above, this can be done prior to dispensing the tea 102 in the sealing and cutting system 210 by an infuser 320, or can be infused prior to feeding the tea into the dispensing mechanism 300. The tea leaves can be infused with flowers, isolates, supplements, and hemp CBD oils, including but not limited to water soluble CBD oils and powders. When infusing with CDB oils, the infusion may or may not include THC.

While the above is described in connection with whole leaf tea, the biodegradable pillow tea bags 100 of the present invention may also be used for ground coffee. Accordingly, rather than tea, a predetermined amount of ground coffee may be dispensed into the biodegradable infusion material in the same manner as the whole leaf tea. In this regard, throughout this specification, in all instances where the application discusses the composition or making of the biodegradable pillow tea bags of the invention, the whole leaf tea 102 in the biodegradable pillow tea bags 100 can be interchanged with ground coffee, including infusing and adding supplements to the coffee in the same manner as a tea.

It will be understood, and is appreciated by persons skilled in the art, that one or more processes, sub-processes, or process steps described above and in connection with the manufacturing of the biodegradable whole leaf tea bag may be performed by machines controlled by software. If the process is performed by software, the software may reside in software memory (not shown) in a suitable electronic processing component or system such as, one or more of the functional components or modules. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Electronic processing component or system such as, one or more of the functional components or modules, may be directly connected to one other or may be in signal communication. It will be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

The foregoing description of implementations has been presented for purposes of illustration and description. It is not exhaustive and does not limit the claimed inventions to the precise form disclosed. Modifications and variations are possible in light of the above description or may be acquired from practicing the invention. The foregoing description is for the purpose of illustration only, and not for the purpose of limitation. The claims and their equivalents define the scope of the invention.

I claim:

1. A method for manufacturing biodegradable pillow bags, the method comprising the steps of:
   providing a biodegradable infusion substrate having two opposing edges;
   creating a sleeve from the biodegradable infusion substrate by sealing the two opposing edges of the substrate together;
   sealing the bottom of the sleeve;
   placing a steeping material in the bottom of the sleeve of the biodegradable infusion substrate using a material dispensing mechanism having an inlet for receiving the steeping material, an infuser for infusing the steeping material with at least one supplement, and a mechanism for dispensing, at intervals, a predetermined amount of steeping material infused with at least one supplement into a feeding tube in an amount to create a single pillow bag;
   vertically feeding the sleeve containing the steeping material into a heat-sealing machine that will, at predetermined intervals, apply heat across the sleeve to create horizontal heat seals, wherein the heat-sealing machine includes at least one sealing mechanism having a central channel, where the predetermined intervals in which the sleeve is vertically fed into the heat-sealing machine occur after receiving a predetermined amount of steeping material to create a single pillow bag;
   creating pillow bags containing steeping material from the sleeve by cutting across the horizontal center of the horizontal heat seals with a cutting mechanism housed within the central channel of the at least one sealing mechanism, where the cutting mechanism is supported by an actuating mechanism that actuates the cutting mechanism from within the central channel of the at least one sealing mechanism to cut through the center of the horizontal heat seal.

2. The method of claim 1 where the biodegradable infusion substrate is comprised of a plurality of mono-component mono-constituent Polylactic Acid (PLA) fibers that is free from plasticizers and other surface treatments.

3. The method of claim 1 where the biodegradable infusion substrate contains hemp.

4. The method of claim 1 where the steeping material is infused with CBD oil.

5. A method for manufacturing biodegradable pillow bags, the method comprising the steps of:
   providing a continuous sheet of biodegradable infusion material having opposing free side ends;
   feeding the sheet of biodegradable infusion material downward into a sealing and cutting system having a dispensing mechanism attached thereto, where the dispensing mechanism includes an inlet for receiving steeping material, an auger for dispensing predetermined amounts of steeping material into a feeding tube in amounts to create a single pillow bag;
   forming the biodegradable infusion material into a tubular member by wrapping the biodegradable infusion material around a vertical tube on the sealing and cutting system;
   joining and sealing the opposing free side ends of the biodegradable infusion material wrapped around the tube with a vertical sealing mechanism to create a sleeve;
   advancing the vertically sealed tubular biodegradable infusion material past the lower end of the tube on the sealing and cutting system until it reaches a horizontal sealing member;
   creating a horizontal seal along the bottom of the tubular biodegradable infusion material with the horizontal sealing mechanism, where the horizontal sealing mechanism includes a central channel housing a cutting mechanism that is supported by an actuating mechanism that actuates the cutting mechanism from within the central channel of the horizontal sealing mechanism to cut through the center of the horizontal seal;
   depositing a predetermined amount of steeping material in the bottom of the tubular biodegradable infusion material by dispensing a predetermined amount of steeping material through the tube on sealing and cutting system;
   advancing the tubular biodegradable infusion material below the horizontal sealing mechanism such that the steeping material deposited in the bottom of the tubular biodegradable infusion material is below the horizontal sealing mechanism; and
   sealing the tubular biodegradable infusion material to create a top seal on the tubular biodegradable infusion material below the horizontal sealing mechanism and cutting the seal at its middle with the cutting mechanism to create a biodegradable pillow bag.

6. The method of claim 5 where the horizontal sealing mechanism comprises of right and left clamping components.

7. The method of claim 6 where at least one of the right and left clamping components includes the central channel.

8. A method for manufacturing biodegradable pillow bags encasing steeping material, the method comprising the steps of:
   providing a biodegradable infusion substrate having two opposing edges;
   creating a sleeve from the biodegradable infusion substrate by sealing the two opposing edges of the substrate together;

sealing a bottom of the sleeve;
dispensing a first predetermined amount of steeping material into the bottom of the sleeve in an amount to create a single pillow bag;
vertically feeding the sleeve into a heat-sealing machine including a cutting mechanism positioned within a sealing mechanism where the bottom seal and the first predetermined amount of steeping material are positioned below the heat-sealing machine;
creating a horizontal heat seal across the sleeve;
cutting across the center of the horizontal heat seal with the cutting mechanism to create pillow bags, wherein the cutting mechanism is positioned within the sealing mechanism in alignment with the center of the seal when the horizontal heat seal is created by the sealing mechanism and where the cutting mechanism is supported by an actuating mechanism and where the cutting mechanism is actuated by the actuating mechanism to cut through the center of the horizontal heat seal;
repeatedly dispensing subsequent predetermined amounts of steeping material into the bottom of the sleeve in an amount to create a single pillow bag;
vertically feeding the sleeve into the heat-sealing machine after each repeated dispensing of subsequent predetermined amounts of steeping material, creating a horizontal heat seal across the sleeve and cutting across the center of the horizontal heat seal with the cutting mechanism to create pillow bags.

9. The method for manufacturing biodegradable pillow bags of claim 8 where the step of dispensing is performed by a dispensing mechanism having an inlet for receiving the steeping material, an infuser for infusing the steeping material with at least one supplement, and a mechanism for dispensing, at intervals, a predetermined amount of steeping material infused with at least one supplement into the sleeve in an amount to create a single pillow bag.

10. The method for manufacturing biodegradable pillow bags of claim 8 where the step of dispensing is performed by a dispensing mechanism having an inlet for receiving steeping material and an auger for dispensing predetermined amounts of steeping material into the sleeve in amounts to create a single pillow bag.

\* \* \* \* \*